Aug. 1, 1939.    H. ROTTENBURG    2,167,910
THREADED AND OTHER BOLTS, PINS, AND THE LIKE
Filed Oct. 30, 1937

Henry Rottenburg
INVENTOR
By Otto Munk
his Atty.

Patented Aug. 1, 1939

2,167,910

UNITED STATES PATENT OFFICE 2,167,910

THREADED AND OTHER BOLTS, PINS, AND THE LIKE

Henry Rottenburg, Cambridge, England

Application October 30, 1937, Serial No. 171,857
In Great Britain November 6, 1936

1 Claim. (Cl. 85—1)

This invention relates to threaded and other bolts, pins and the like, and has for its object to provide what may be termed a self-aligning bolt or pin; that is to say a bolt or pin which will readily pass through initially mis-aligned holes in superposed plates or the like, its insertion in the assembly bringing the holes into alignment and allowing it to slip through them.

For this purpose a threaded or other bolt, pin or the like according to the invention is provided with an eccentrically disposed spigot extension which extends substantially to, but not beyond, the axial projection of the bolt. In other words the spigot extension is adapted to enter a hole into which the bolt is adapted to fit and, on rotation of the bolt, to sweep out a circle representing the axial projection of the bolt and so draw the bolt and the hole into mutual alignment.

It will be appreciated that in the case of a threaded bolt the outer or most eccentric part of the spigot surface should be correspondingly threaded or, if plain, should not extend beyond the axial projection of the base of the thread on the bolt proper.

Further features of the invention will be apparent from the following description and accompanying drawing, which have reference to various examples of bolts and pins formed in accordance therewith.

Figure 1:
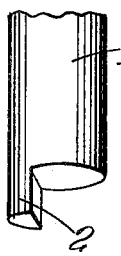
Figure 1 is a perspective view of the free end of a plain cylindrical pin shaped in accordance with the invention.

In the construction shown in Figure 1 a "step" is cut from the free end of the pin 1, by means of a square ended milling cutter or planing tool, so as to leave a spigot extension 2, of D-shape in cross section, whose curved outer surface constitutes a continuation of the cylindrical surface of the pin proper.

Figure 2:
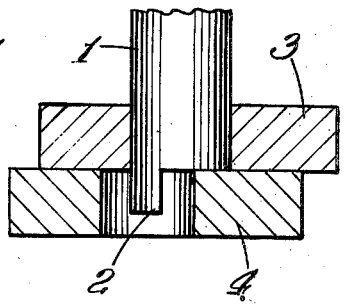
Figures 2 and 3 are respectively sectional and inverted plan views illustrating the action of the pin of Figure 1.
Figure 3:
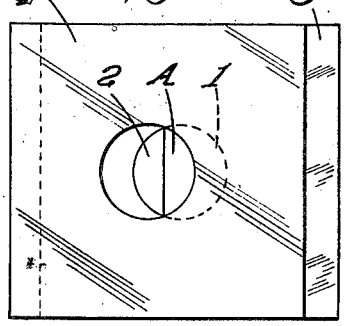

Figures 2 and 3 illustrate the action of this pin when being passed through two superposed plates 3 and 4 provided with holes which are adapted to receive the pin with a sliding fit, but which are initially out of alignment. The degree of eccentricity of the holes is shown as extreme for the purpose of clarity.

The pin is inserted in the upper hole and turned until the spigot extension 2 drops into the cavity formed by the overlapping of the holes, thus reaching the position shown in the figures. Further turning of the pin about its axis A (Figure 3) will evidently cause the spigot 2 to sweep out the dotted circle, which is the axial projection of the pin proper, thus drawing the lower hole into alignment and allowing the pin to drop fully into place.

Figure 4:
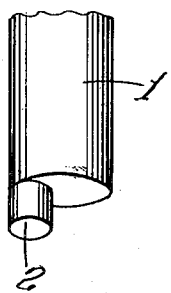
Figure 4 is a view similar to Figure 1 showing a modified form of pin.

The shoulders of the spigot 2 may be rounded off to any desired extent, up to the point where the cylindrical spigot shown in Figures 4 results. This form of spigot would evidently deal with a larger degree of mis-alignment of holes than is shown in Figures 2 and 3, if necessary, and would in general tend to operate more smoothly where holes were very substantially out of line.

Figure 5:
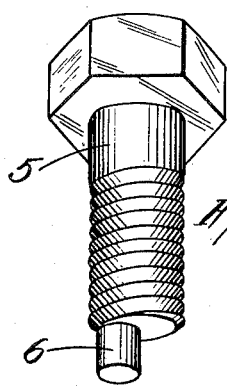
Figure 5 is a perspective view of a threaded bolt according to the invention.

The principle described may of course be applied to threaded bolts and the like, and Figure 5 shows a bolt 5 provided with a cylindrical spigot extension 6 which acts in the same manner as that of the pin in Figure 4. It will be observed, however, that in this case the surface of the spigot 6 must not extend laterally beyond the axial projection of the base of the thread on the bolt, otherwise it would sweep out a circle larger than that defined by the apex of the thread in the corresponding hole, and alignment would be impossible.

Figure 6:
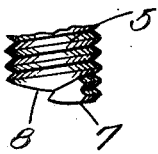
Figures 6, 6a and 6b are different perspective views of a modification.
Figure 6A:
Figure 6B:
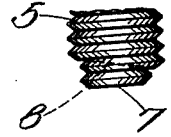

The modification shown in Figures 6, 6a and 6b differs from that of Figure 5 in that the spigot 7 is threaded on its outside face, which forms in effect a continuation of the threaded surface of the bolt proper. The spigot is provided with two threads, the uppermost of which is continuous with the last thread on the bolt; this arrangement has been found to give a dependable engagement of the spigot thread with the internal thread in the offset hole during the process of alignment. It will be appreciated that in this case the bolt is drawn downwards while it is being turned to effect alignment, and consideration will show that for this reason the base or end face 8 of the bolt proper cannot be a plane at right angles to the bolt axis, as in Figure 5, but must be inclined so that towards its margin it follows the last thread on the bolt proper.

This particular form of spigot seems to be as reliable as any, and can in practice readily be formed on a standard threaded bolt by a single straight cut with a square ended milling cutter or planing tool.

Figure 7:
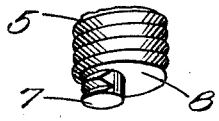
Figure 7 illustrates a further modification.

If desired the spigot 7 of Figures 6, 6a and 6b may have its shoulders rounded to give it an oval, or even a cylindrical section as indicated in Figure 7, and in such cases the threads on it may be carried further round and "shaded off" instead of ending in the somewhat sharp points visible in the preceeding figures. This tends to facilitate smooth engagement with the threads of an offset hole.

In all cases the spigot may be tapered towards its free end so as to increase the maximum misalignment with which it can deal, without undue sacrifice of its strength, and in fact an extremely simple contemplated form of the invention could be obtained by cutting off the end of the pin or bolt at an angle, so that its base or end face is oblique to its axis.

I claim:

A threaded bolt stepped at its end to form a single eccentric spigot extension onto whose outer surface the last complete thread crest on the bolt proper is continued without interruption, said spigot extension including at least one further thread segment and having at its free end a maximum transverse dimension substantially less than the overall diameter of said bolt, and the end face of the bolt proper being helically cut, at least adjacent its periphery, to follow said last complete thread crest.

HENRY ROTTENBURG.